(12) United States Patent
Okabe et al.

(10) Patent No.: US 7,077,774 B2
(45) Date of Patent: *Jul. 18, 2006

(54) ROLLER CHAIN TRANSMISSION DEVICE

(75) Inventors: Isamu Okabe, Osaka (JP); Tomotaka Koga, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 195 days.

This patent is subject to a terminal disclaimer.

(21) Appl. No.: 10/774,020

(22) Filed: Feb. 6, 2004

(65) Prior Publication Data

US 2004/0192481 A1    Sep. 30, 2004

(30) Foreign Application Priority Data

Mar. 31, 2003 (JP) .............................. 2003-095185

(51) Int. Cl.
*F16G 13/06* (2006.01)
(52) U.S. Cl. ...................... 474/231; 474/206
(58) Field of Classification Search .............. 474/206, 474/226, 230, 231
See application file for complete search history.

(56) References Cited

U.S. PATENT DOCUMENTS

| | | | | |
|---|---|---|---|---|
| 3,448,629 A | * | 6/1969 | Norcross et al. | ............ 474/148 |
| 4,036,071 A | * | 7/1977 | McKnight et al. | ........... 474/156 |
| 4,315,750 A | * | 2/1982 | Kawashima et al. | ......... 474/153 |
| 5,382,199 A | | 1/1995 | Ducharme | |
| 5,507,697 A | * | 4/1996 | Ledvina et al. | ................ 474/85 |
| 5,848,948 A | * | 12/1998 | Allen | ........................... 474/156 |
| 2004/0171450 A1 | * | 9/2004 | Kaga et al. | .................. 474/231 |
| 2005/0119079 A1 | * | 6/2005 | Okabe | ......................... 474/155 |

FOREIGN PATENT DOCUMENTS

EP    1 203 902 A2    5/2002
GB       947669       1/1964

OTHER PUBLICATIONS

Roller Chain Transmission Device, U.S. Appl. No. 10/774,650, Isamu Okabe et al., Filing Date Feb. 6, 2004, USA.

* cited by examiner

*Primary Examiner*—Vicky A. Johnson
(74) *Attorney, Agent, or Firm*—Howson and Howson

(57) ABSTRACT

In a roller chain transmission, the diameter D of the rollers, the outer diameter d of the pins, and the height H of the inner plates satisfy the relationships $0.72P \leq D \leq 0.79P$, $0.40P \leq d \leq 0.44P$, and $0.96P \leq H$, with respect to the chain pitch P. The radius r of the arc of the tooth gap bottom of the sprocket teeth satisfies the relationship $0.505D \leq r \leq 0.505D + 0.069 \sqrt[3]{\sqrt{D}}$. The transmission chain exhibits high durability due to improved strength and wear resistance under high loads.

1 Claim, 7 Drawing Sheets

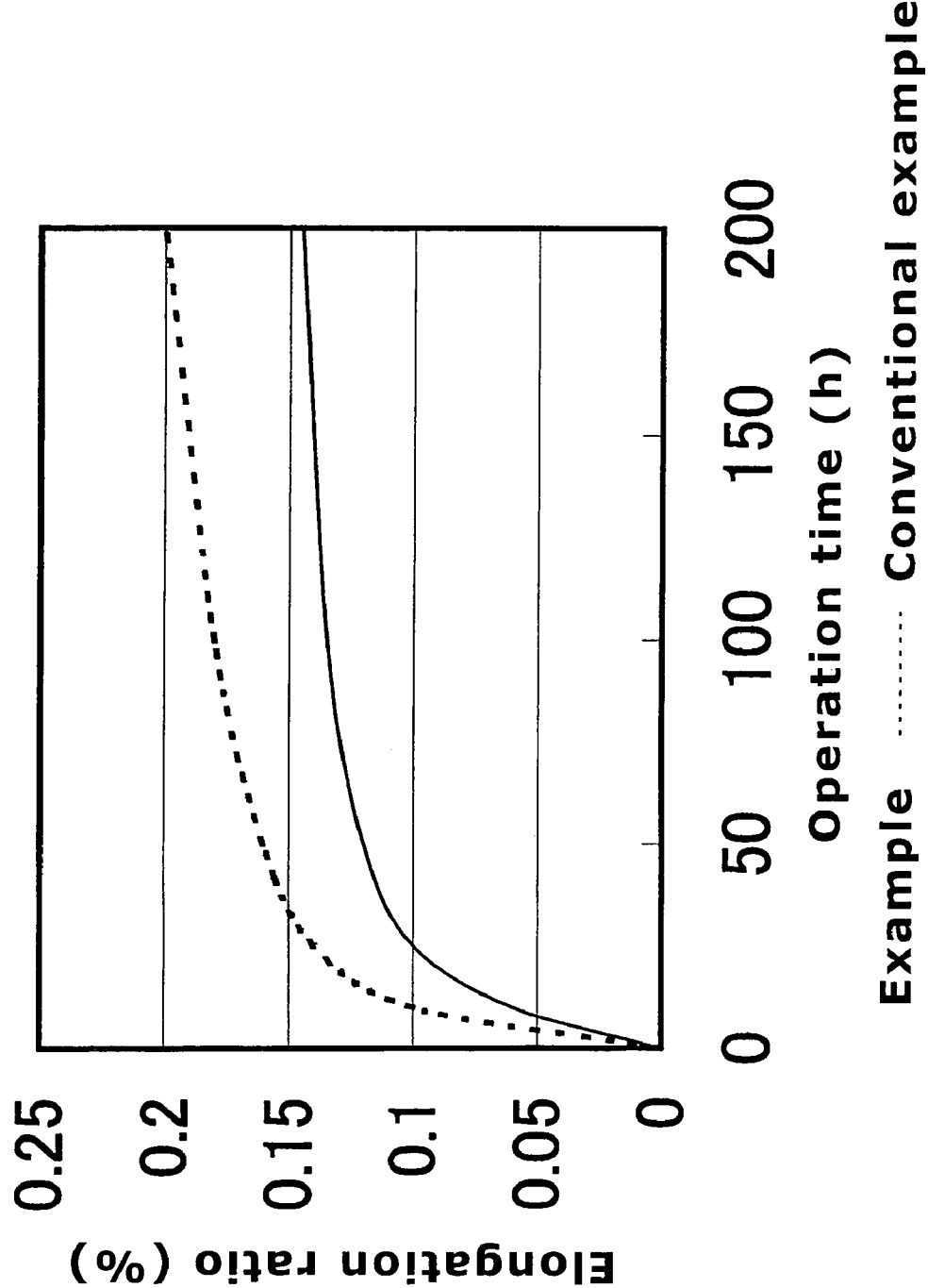

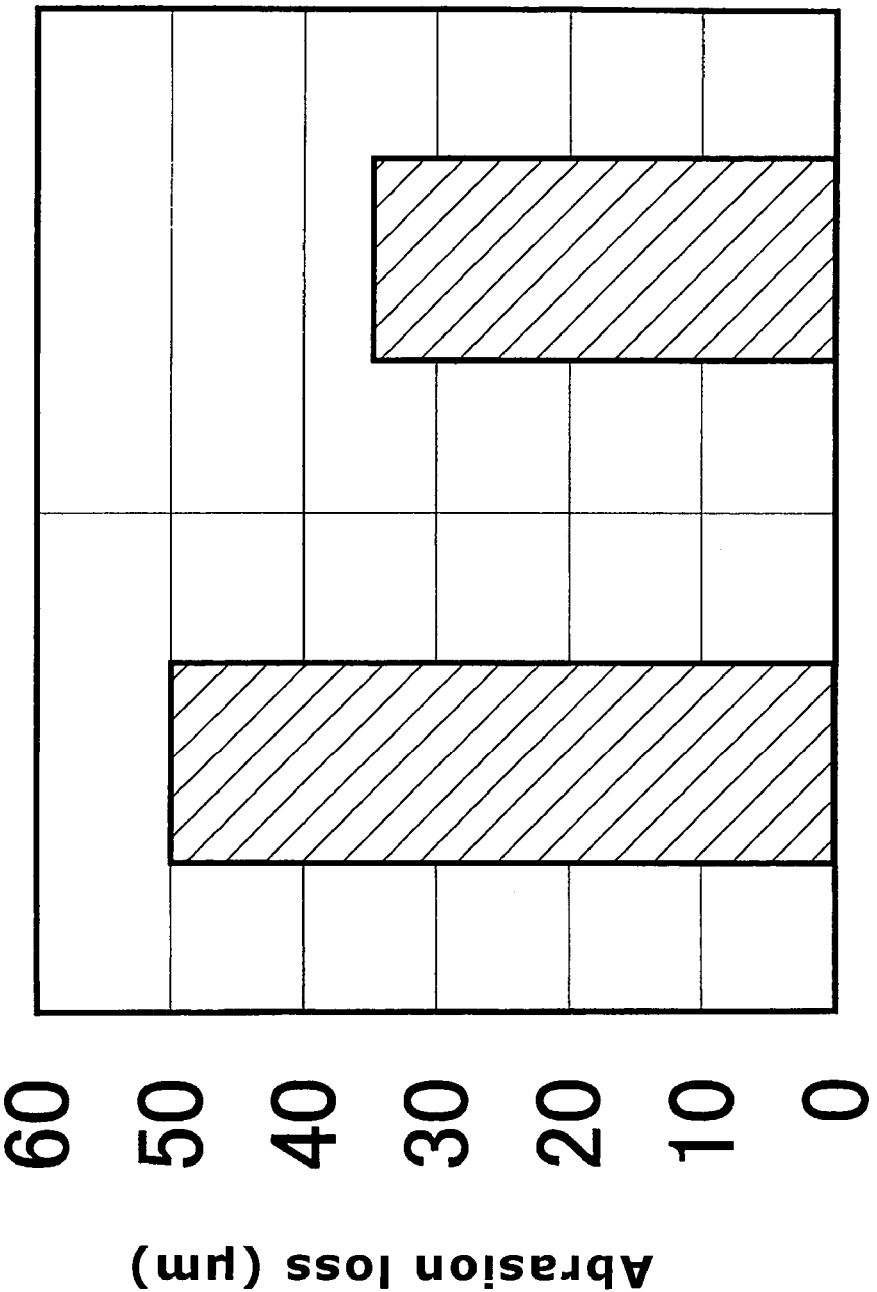

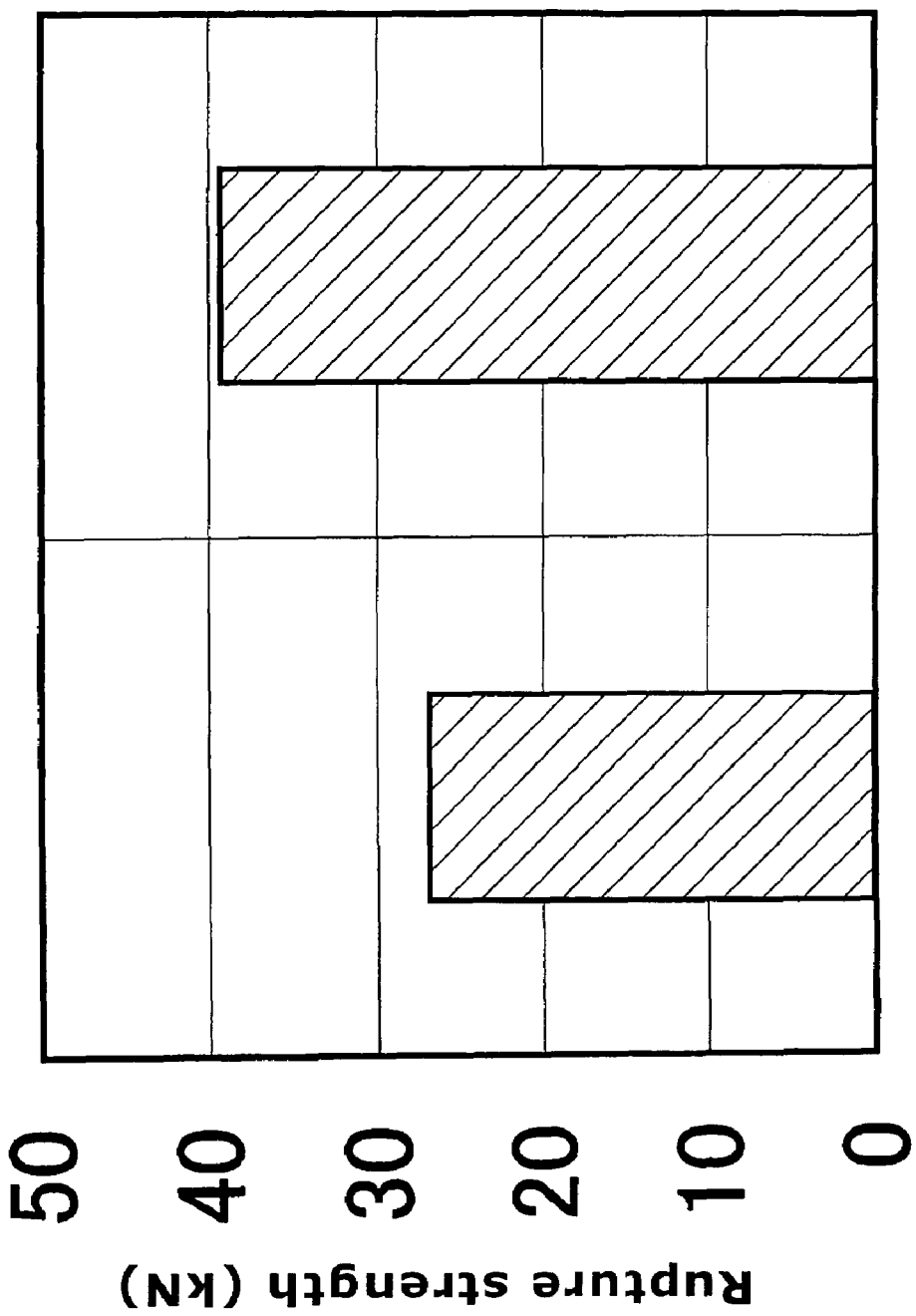

ROLLER CHAIN TRANSMISSION DEVICE

FIELD OF THE INVENTION

This invention relates to a roller chain transmission of the kind used for power transmission in an automobile, an industrial machine, or a conveyor. The invention has particular utility as a timing transmission in an automobile engine, for driving a valve-operating camshaft.

BACKGROUND OF THE INVENTION

In recent years, roller chains have come into increasing use, as a result of the demand for high load capacity, high speed operation and maintenance-free operation. For these reasons, roller chains have displaced toothed belts, which were previously commonly used in automotive timing drives.

As shown in FIGS. 7(a)–7(c), a conventional roller chain 500 for a timing transmission comprises an inner link 520 (FIG. 7(b)) and an outer link 540 (FIG. 7(c). In the inner link 520, both ends of each of two cylindrical bushings 522 fit into bushing holes 526 in a pair of inner plates 524, and rollers 528 are rotatable on the bushings 522. In the outer link 540, two pins 542 are secured to pin holes 546 in a pair of outer plates 544, disposed on the outsides of the pair of inner plates 524. The pins 542 extend through the bushings, and the pins and bushings are relatively rotatable. The roller chain meshes with sprockets (not shown in FIG. 7(a)–7(c)).

A conventional roller chain transmission utilizes a so-called "A series" roller chain, which satisfies the relationships $0.591 \leq D/P \leq 0.640$, and $0.281 \leq d/P \leq 0.377$, and a "B series" roller chain, which satisfies the relationships $0.575 \leq D/P \leq 0.670$, and $0.288 \leq d/P \leq 0.389$, according to JIS B 1801, D being the outer diameter of the roller, d being the outer diameter of the pin, and P being the pitch of the roller chain.

These standards have generally been adhered to because it has been considered that, when the ratio D/P is too high, the widths of the sprocket teeth become excessively small and insufficiently strong. On the other hand, when the ratio D/P is too low, the outer diameter d of the pins, which extend through the bushings, is decreased, which leads to reduction in the strength of the chain. Thus, among the B series roller chains, a chain having a pitch of 9.525 mm, a roller outer diameter of 6.35 mm and a pin outer diameter of 3.28 mm, that is, a "06B" chain according to ISO and JIS B 1801 standards, has been used often as a timing transmission medium for an automobile engine.

It has been reported that, when the above-mentioned conventional roller chains were used as timing chains in an automobile engine under high loads, for example 4 kN, some of the chains failed to exhibit the expected durability.

For further improvement of the reliability of the engine, further enhancement of durability, and low noise, have been required in roller chain transmissions.

As a result of intensive study of the above problems, we have found that the "elongation—wear Resistance" of a roller chain, which may be within the allowable range in other applications, becomes critical when a roller chain is used as a camshaft drive chain for precision timing in an automobile engine, and unexpectedly high loads are applied to the chain link connected pins at higher engine speeds. Thus, it has become clear that the size ratios (D/P, d/P) of the roller chain pitch P, the outer diameter D of the roller, and the outer diameter d of the pin, which are conventionally set on the basis of size balances, are not necessarily optimum values.

Furthermore, it has become clear that the specified standard tooth forms of conventional sprockets are not necessarily optimum from the standpoint of wear resistance.

Accordingly, the objects of the invention are to solve the above-described problems of conventional roller chain transmission devices by optimizing the shapes and sizes of the roller chain and sprocket; to provide a roller chain transmission which enhances the wear resistance and strength; and, in particular, to provide a roller chain transmission which exhibits sufficient endurance even when used as a timing drive in an automobile engine operated at high speed.

SUMMARY OF THE INVENTION

The roller chain transmission in accordance with the invention comprises a roller chain having interleaved pairs of inner and outer plates, cylindrical bushings fixed to bushing holes in the inner plates, pins rotatable in said bushings and fixed to pin holes in the outer plates, rollers rotatable on the bushings, and a toothed sprocket meshing with the roller chain. To attain the above objects, the outer diameter D of the rollers, the outer diameter d of the pins, and the height H of the inner plates, satisfy the following relationships with respect to the pitch P of the roller chain:

$$0.72P \leq D \leq 0.79P$$

$$0.40P \leq d \leq 0.44P$$

$$0.96P \leq H,$$

and the sprocket teeth have a tooth gap bottom with a radius r, satisfying the relationship $$0.505D \leq r \leq 0.505D + 0.069 \sqrt[3]{\sqrt{d}}.$$

The term "radius", when referring to an arc of the tooth gap bottom, corresponds substantially to the radius of the chain roller, as set forth in "Terms and Marks Relating to Chains" (revised in July of Heisei 7 year), published by The Japanese Chain Industrial Society, and incorporated by reference.

The reasons for the relationships $0.72P \leq D \leq 0.79P$ and $0.40P \leq d \leq 0.44P$ (that is $0.72 \leq D/P \leq 0.79$, and $0.40 \leq d/P \leq 0.44$), and for the relationship $0.96P \leq H$, are as follows.

When d/P is set to 0.40 or more, the strength of the pin is enhanced as a result of its increased diameter, so that snapping of the pin under the high loads encountered during high speed rotation is avoided. On the other hand, when d/P is more than 0.44, the walls of the bushing and the roller necessarily become too thin, and, as a result, the strength of the chain is undesirably reduced. Furthermore, it is necessary to maintain the wall thicknesses of the bushing and roller at conventional levels to maintain the shock resistance of the bushing and roller. Accordingly, D/P is set to a value within the range from 0.72 to 0.79 when d/P is set to a value within the range from 0.40 to 0.44.

Furthermore, when d/P conforms to the relation $0.40 \leq d/P \leq 0.44$, the diameter of the bushing is greater than the diameter of a conventional bushing. Thus, the minimum cross-section of the inner link (that is a vertical cross-section taken through the axis of the bushing) is reduced. The reduction of the cross-section of the inner link would result in a reduction in strength. Accordingly, the reduction in the minimum cross-section is suppressed by increasing the height H of the inner link, which is about 86% of the chain pitch P in a conventional roller chain, to at least 96% of the chain pitch.

The sprocket used with the roller chain, has a tooth form calculated in accordance with the reference size calculation equation defined in ISO 606 (BS 228). However, the radius r of the arc of the tooth gap bottom satisfies the relation $0.505D \leq r \leq 0.505D+0.069\sqrt[3]{\sqrt{D}}$. This relationship ensures smooth movement of the sprocket at engagement and disengagement with the roller chain. When the radius of the arc of the tooth gap bottom deviates from this range, the efficiency of transmission of rotational torque from the chain to the sprocket is undesirably reduced.

In the roller chain transmission mechanism according to the invention, the outer diameter D of the roller and the outer diameter d of the pin satisfy the relations $0.72 \leq D/P \leq 0.79$, and $0.40 \leq d/P \leq 0.44$ with respect to the pitch P, and the height H of the inner plate satisfies the relation $0.96P \leq H$. Accordingly, the diameter of the pin is increased and pin rupture strength is remarkably enhanced so that the roller chain articulates smoothly over a long period of time.

Furthermore, since the diameter of the pin is increased, the contact area between the pin and the bushing is increased so that the contact stress on the pin and the bushing, is decreased. As a result, wear of the pin and the bushing is reduced, and elongation of the chain is suppressed, so that proper engagement of the chain with the sprocket is realized over a long period of time. Further, since the minimum cross-section of the inner link is increased, stress concentration at the location where the bushing is press fit into the inner can be avoided.

Since the sprocket satisfies the relation $0.505D \leq r \leq 0.505D+0.069\sqrt[3]{\sqrt{D}}$, the radius r of the arc of the tooth gap bottom is also increased and larger than the corresponding radius in a conventional sprocket. As a result, the contact surface pressure between the roller and the sprocket becomes smaller than in the conventional case, so that wear in the sprocket teeth under high load is suppressed.

BRIEF DESCRIPTION OF THE DRAWINGS

FIG. 3 is a graph showing the results of elongation ratio tests on a roller chain in accordance with the invention and a conventional roller chain;

FIG. 4 is a bar graph showing the results of tooth wear tests on a sprocket according to the invention and a conventional sprocket;

FIG. 5 is a graph showing the results of tests of the rupture strength of a roller chain in accordance with the invention and a conventional roller chain;

DETAILED DESCRIPTION OF THE PREFERRED EMBODIMENTS

Figure 1:
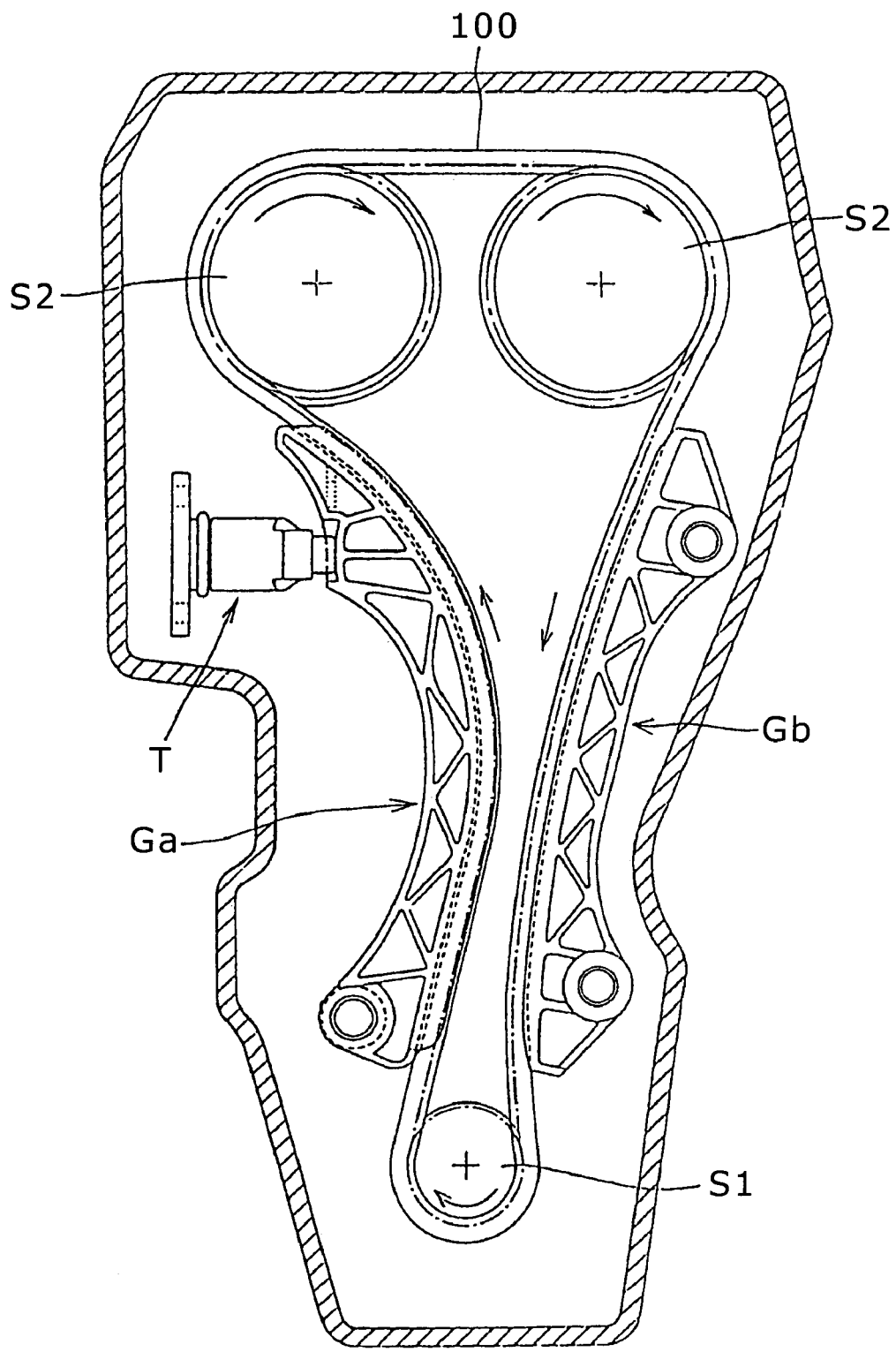
FIG. 1 is a schematic elevational view of a roller chain transmission device according to the invention.

In the transmission shown in FIG. 1 a roller chain 100 is in mesh with a driving sprocket S1 on a crankshaft (not shown) and a pair of driven camshaft sprockets S2. A movable guide Ga cooperating with a tensioner T is in sliding contact with the chain 100 and imparts tension to the chain. A fixed guide Gb regulates the traveling path of the chain 100.

Figure 2A:
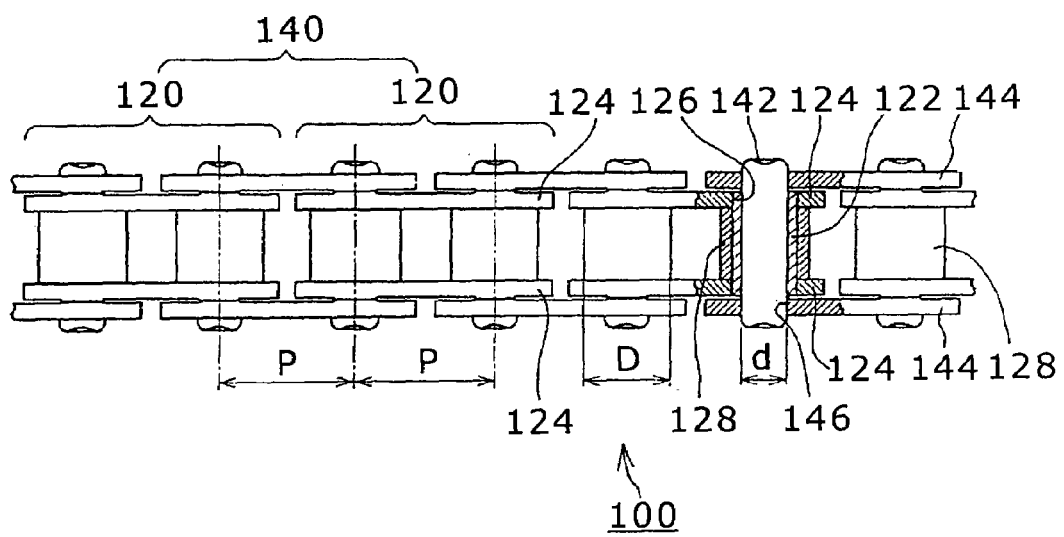
FIGS. 2(a) and 2(b) are respectively plan and elevational views of a part of a roller chain according to the invention, FIG. 2(a) being partly in cross-section.
Figure 2B:
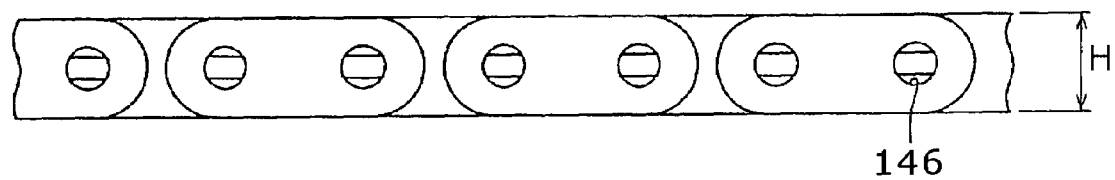

As shown in FIGS. 2(a) and 2(b), the roller chain 100 comprises inner links 120 having cylindrical bushings 122, and inner plates 124, with bushing holes 126, in which the opposite ends the bushings 122 are secured. Rollers 128 are rotatable on the bushings 122. Outer links 140 are composed of outer plates 144 and pins 142. The outer plates 144 are disposed on the outsides of the pairs of inner plates 124 in overlapping relationship. The pins 142 extend rotatably through the bushings, and have both ends secured in pin holes 146 in the outer plates 144.

The sizes of the respective elements are selected so that the outer diameter D of the rollers and the outer diameter d of the pins satisfy the relation $0.72P \leq D \leq 0.79P$, and $0.40P \leq d \leq 0.44P$ with respect to the pitch P, respectively, and the height H of the inner plate satisfies the relation $0.96P \leq H$.

In the example of a transmission device shown in FIG. 1, the rollers of the roller chain had an outer diameter of 7.06 mm, the pins had an outer diameter of 3.95 mm, the chain pitch was 9.525 mm, and the height of the inner plates was 9.3 mm. As a result, D/P=0.741, d/P=0.415, and H/P=0.976, these values satisfying the above relational expressions.

In the tests, the results of which are depicted in FIGS. 3–6, the transmission used as a conventional example had a 06 B roller chain (according to both ISO and JIS B1801) with a chain pitch of 9.525 mm, a roller outer diameter of 6.35 mm, a pin outer diameter of 3.28 mm, and an inner plate height of 9.525 mm.

The testing method for determining elongation ratios, expressed in percent (%) in FIG. 3, comprised the steps of wrapping a roller chain having 96 links around two sprockets having 18 and 36 teeth respectively, and rotating the roller chain at 6500 rpm while keeping the tension at 2.0 kN, in order to measure the elongation index (%) of the chain. The solid line shows the results measured for the roller chain of the invention in accordance with the above-described example, and the broken line shows results measured for the conventional roller chain.

As can be seen from FIG. 3, in the roller chain of the invention, the elongation ratio after 200 hours was only about 70% of the elongation ratio of the conventional roller chain. Furthermore, in measurement of the contact stresses between the pin and the bushing, the contact surface pressure between sprocket and the roller chain in the invention was reduced by about 10% as compared with the conventional roller chain. It is surmised that the reduction in contact surface pressure was responsible for the suppression of the elongation ratio.

As apparent from FIG. 4, the sprocket in accordance with the invention exhibited about 30% less abrasion loss compared with the sprocket used in the conventional roller chain transmission. The decreased abrasion loss is believed to be due to the fact that the sprocket used in the roller chain transmission of the invention had a arcuate tooth gap bottom portion with an increased radius, which cooperated with the larger roller, and as a result, the contact surface pressure between the roller and the sprocket was decreased as compared with the conventional transmission.

FIG. 5 shows the results of pin rupture strength measurements of the roller chains used in the invention (the rupture strength being measured in kN). In the testing method, a roller chain of 5 links or more was mounted on a tensile testing machine, and the limit of tensile load was measured, as determined by pin rupture. As can be seen from FIG. 5, the rupture strength of the pin in the roller chain according to the invention was 1.5 times greater than that of the conventional roller chain.

Figure 6:
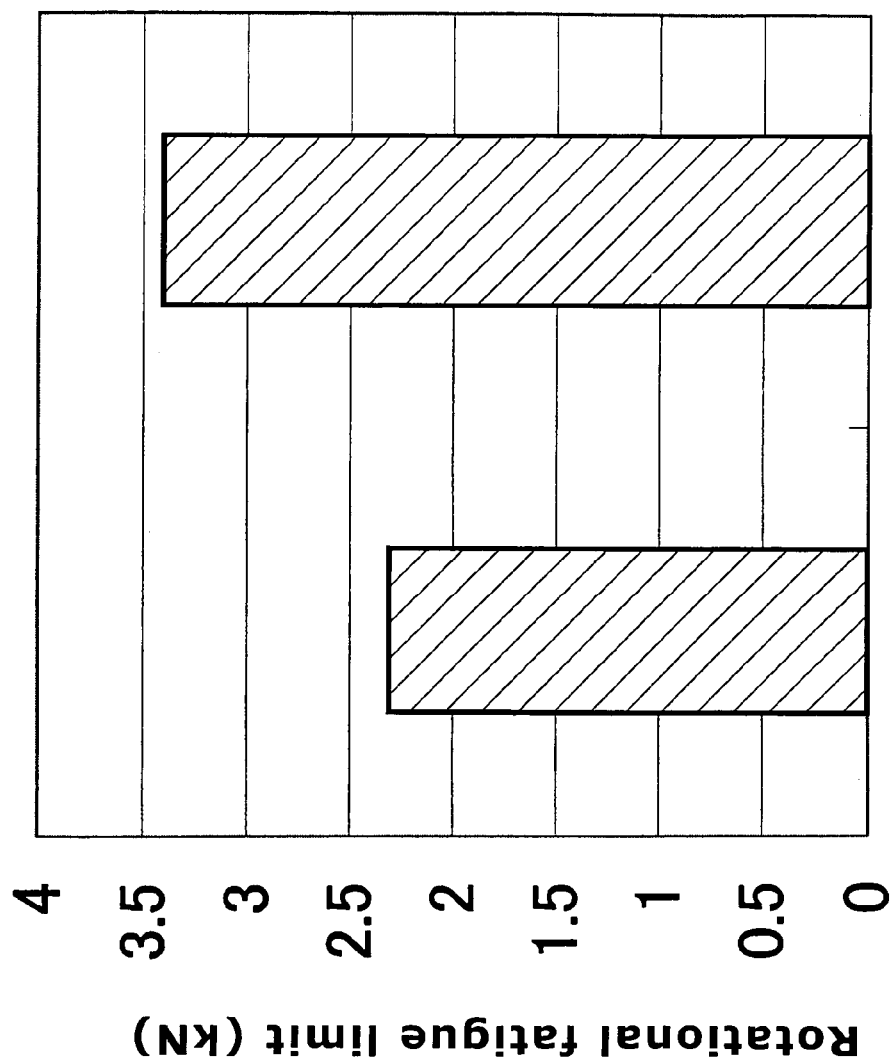
FIG. 6 is a graph showing the results of tests of rotational fatigue limits of a roller chain in accordance with the invention and a conventional roller chain.
Figure 7A:
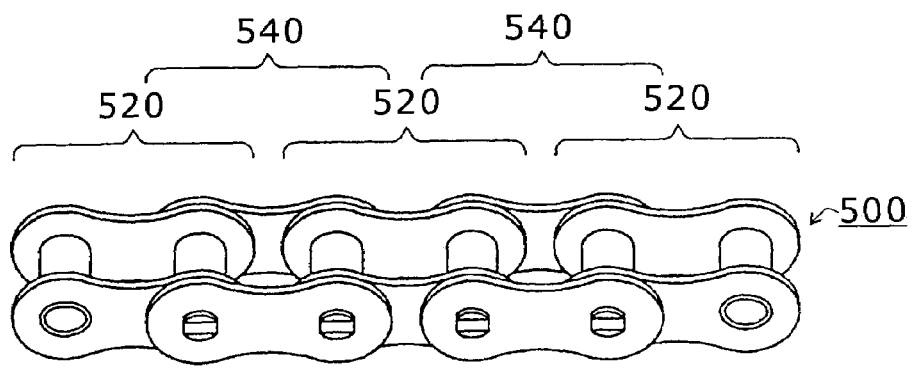
FIGS. 7(a), 7(b) and 7(c) are perspective views respectively of a part of a conventional roller chain, an inner link thereof, and an outer link, the outer link being shown in exploded view.
Figure 7B:
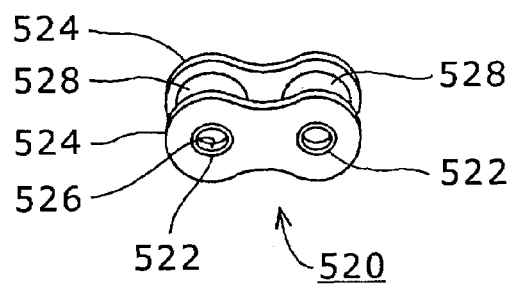
Figure 7C:
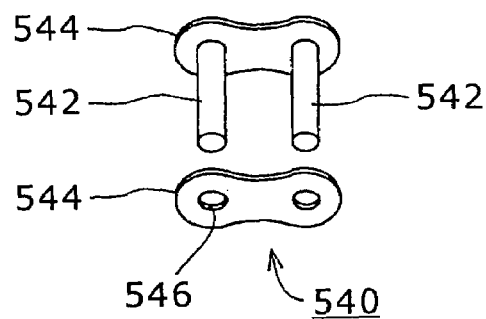

FIG. 6 shows measured results of rotational fatigue limits (kN) of the roller chains used in the invention. The rotational fatigue limit is a load limit which does not generate fatigue fracture after a predetermined number of repeated loads. The test method defined in JIS B1801 (revised in 1997) was used to measure the limits.

As can be seen from FIG. 6, the fatigue limit of the roller chain in accordance with the invention was enhanced by about 1.5 times compared with the fatigue limit of the conventional chain. The improvement in the fatigue limit is believed to be a result of setting the height H of the inner plate to at least 96% of the chain pitch P, so that the minimum cross-section area of the inner plate is increased, and stress concentration at this location is avoided.

In the above-described example, the roller chain had an outer roller diameter D of 7.06 mm, an outer pin diameter d of 3.95 mm, a pitch P of 9.525 mm, and an inner plate height H of 9.3 mm. However, so long as the roller chain satisfies the relations $0.72P \leq D \leq 0.79P$, and $0.40P \leq d \leq 0.44P$, as well as $0.96P \leq H$, significant reduction of the elongation ratio, and enhancement of the rupture strength and rotational fatigue limit may be realized.

In the sprocket of the invention, the sprocket tooth width is decreased as the chain roller diameter increases. However, the decrease in sprocket tooth width does not result in problems due to insufficient strength if the sprocket tooth size is determined in accordance with the reference size calculation equation based on the outer diameter D of the rollers in the roller chain. Specifically, a sprocket is used which satisfies the relation $0.505D \leq r \leq 0.505D + 0.069\sqrt[3]{D}$. In the present example a sprocket having a tooth gap bottom arc with a radius of 3.63 mm was used. Any of the S, U, and ISO tooth forms can be used.

If the sprocket satisfies the relational expressions defined above, the decrease in sprocket tooth width does not result in problems due to insufficient strength. Furthermore, by enhancing the strength of the sprocket through appropriate choice of materials, and thermal treatment, the strength of the sprocket can be improved, and the overall reliability of the roller chain transmission device can be further enhanced.

As explained above, in the roller chain transmission according to the invention, a roller chain in which the outer diameter D of the roller, the outer diameter of the pin and the height of the inner plate satisfy $0.72P \leq D \leq 0.79P$, $0.40P \leq d \leq 0.44P$, and $0.96P \leq H$ with respect to a chain pitch P, is used. This roller chain meshes with a sprocket in which a radius r of the arc of the tooth gap bottom satisfies the relationship $0.505D \leq r \leq 0.505D + 0.069\sqrt[3]{D}$. The diameter of the pins of the roller chain is increased, and pin rupture strength is dramatically enhanced. Thus even when the roller chain transmission of the invention is subjected to high loads when used as a timing drive in an automobile engine, the pins of the chain are resistant to breakage due to age deterioration.

Since the minimum cross-section of the inner plates of the chain is increased, concentration of stress in the vicinity of the locations at which the bushings are press-fit into the inner plates IS avoided, and generation of cracks in the inner plates is suppressed.

Furthermore, since the increased diameter of the pins increases the contact area between the pins and the bushings of the chain, contact stress applied to the pins and the bushings is decreased. As a result, wear of the pins and the bushings is suppressed, the chain elongation ratio is reduced, and the product life is extended.

Finally, the contact surface pressure between the roller and the sprockets is decreased as compared with a conventional transmission, wear of the sprocket teeth is suppressed, and durability and reliability of the transmission are thereby enhanced. When the roller chain transmission of the invention is used as a timing drive, timing precision can be ensured over a long period of time, quietness of operation is enhanced, and a saving of energy can be realized.

In summary, in accordance with the invention, the causes determining the life of a roller chain transmission rotating at high speed, and the causes of noise in the transmission, were studied. The size ratio between a roller chain and a sprocket, and the tooth forms of the sprocket, were optimized, taking the elongation of a chain, the rupture mechanism, and the engagement noise generation mechanism into consideration. The invention has significant industrial importance because it enables endurance and quietness of a roller chain transmission device to be enhanced reproducibly.

The invention claimed is:

1. A roller chain transmission in the timing drive of an automobile engine, the transmission comprising a toothed driving sprocket on a crankshaft of the engine, at least one toothed driven sprocket on a camshaft of the engine, and a roller chain having interleaved pairs of inner and outer plates, cylindrical bushings fixed to bushing holes in the inner plates, pins rotatable in said bushings and fixed to pin holes in the outer plates, and rollers rotatable on said bushings, said toothed sprockets meshing with the roller chain, wherein the outer diameter D of the rollers, the outer diameter d of the pins and the height H of the inner plates satisfy the following relationships with respect to the pitch P of the roller chain:

$0.72P \leq D \leq 0.79P$ $0.40P \leq d \leq 0.44P$ $0.96P \leq H,$ and wherein the sprocket teeth of at least one of said toothed sprockets have an arc-shaped tooth gap bottom, the arc of the tooth gap bottom having a radius r, satisfying the relationship $0.505D \leq r \leq 0.505D + 0.069\sqrt[3]{D}$, where r and D are measured in millimeters.

* * * * *

UNITED STATES PATENT AND TRADEMARK OFFICE
CERTIFICATE OF CORRECTION

PATENT NO. : 7,077,774 B2 Page 1 of 1
APPLICATION NO. : 10/774020
DATED : July 18, 2006
INVENTOR(S) : Isamu Okabe and Tomotaka Koga It is certified that error appears in the above-identified patent and that said Letters Patent is hereby corrected as shown below:

On the cover, under Abstract, line 7 The symbol $\sqrt[3]{\phantom{x}}\sqrt{\phantom{x}}$ should read $\sqrt[3]{\phantom{x}}$ Column 2, line 39 The symbol $\sqrt[3]{\phantom{x}}\sqrt{\phantom{x}}$ should read $\sqrt[3]{\phantom{x}}$ Column 3, line 8 The symbol $\sqrt[3]{\phantom{x}}\sqrt{\phantom{x}}$ should read $\sqrt[3]{\phantom{x}}$ Column 5, line 33 The symbol $\sqrt[3]{\phantom{x}}\sqrt{\phantom{x}}$ should read $\sqrt[3]{\phantom{x}}$ Column 5, line 51 The symbol $\sqrt[3]{\phantom{x}}\sqrt{\phantom{x}}$ should read $\sqrt[3]{\phantom{x}}$ Signed and Sealed this Twelfth Day of December, 2006

JON W. DUDAS
*Director of the United States Patent and Trademark Office*